(12) United States Patent
Shih

(10) Patent No.: US 7,749,656 B2
(45) Date of Patent: Jul. 6, 2010

(54) HYDROGEN STORAGE ALLOY

(76) Inventor: Chih-Kang Shih, H Bank Technology Inc., 3 Fl.-1, No. 310, Sunglung Rd., Taipei City (TW) 11058

( * ) Notice: Subject to any disclaimer, the term of this patent is extended or adjusted under 35 U.S.C. 154(b) by 1141 days.

(21) Appl. No.: 11/385,779

(22) Filed: Mar. 22, 2006

(65) Prior Publication Data

US 2006/0216598 A1    Sep. 28, 2006

(30) Foreign Application Priority Data

Mar. 23, 2005    (TW) .............................. 94108932 A

(51) Int. Cl.
*H01M 4/38* (2006.01)
(52) U.S. Cl. ..................... 429/218.2; 429/101
(58) Field of Classification Search ............... 429/218.2
See application file for complete search history.

(56) References Cited

U.S. PATENT DOCUMENTS

| | | | | |
|---|---|---|---|---|
| 5,753,386 | A * | 5/1998 | Inaba et al. ................. | 429/101 |
| 2004/0217327 | A1* | 11/2004 | Takamaru et al. ........ | 252/182.1 |
| 2005/0255382 | A1* | 11/2005 | Young et al. ............. | 429/218.2 |

OTHER PUBLICATIONS

Feng et al.,"Hydrogen desorption kinetics of a LaNi4.7Al0.3 metal hydride electrode using potentiostatic measurements", Solar energy materials and solar cells, vol. 62, No. 1-2, pp. 51-61, 2000.*
Yuan et al., "Characteristics of LaNi-based hydrogen storage alloys modified by partial 5 substituting La for Ce", Journal of Alloys and Compounds 359 (2003) 300-306.*
Chen et al., "Polytypism of La-Ni phases in multicomponent AB5 type hydride electrode alloys" International Journal of Hydrogen Energy 27 (2002) 63-68.*
Tang et al.,"Study on the microstructure and the electrochemical propertiesof MI0:7Mg0:2Ni2:8Co0:6 hydrogen storage alloy", International Journal of Hydrogen Energy 28 (2003) 815-819.*

* cited by examiner

*Primary Examiner*—Patrick Ryan
*Assistant Examiner*—Ladan Mohaddes

(57) ABSTRACT

The invention provides a hydrogen storage alloy, and in particular, the hydrogen storage alloy according to the invention has a narrow hysteresis and a maximum hydrogen concentration, (H/Lm ($Ni_xAl_yMo_z$)), equal to 7. The hydrogen storage alloy, according to the invention, is an ABw type alloy and represented by the general formula: Lm(NixAlyMoz), and where $4.7 \leq w \leq 5.3$, Lm is a La-rich misch metal and comprises La, Ce, Pr, and Nd., w=x+y+z, x, y and z are a mole number, respectively.

3 Claims, 4 Drawing Sheets

HYDROGEN STORAGE ALLOY

BACKGROUND OF THE INVENTION

1. Field of the Invention

This invention relates to a hydrogen storage alloy and, more specifically, to a hydrogen storage alloy with a narrow hysteresis and a maximum hydrogen concentration, (H/Lm ($Ni_xAl_yMo_z$)), equal to 7.

2. Description of the Prior Art

After hydrogen storage alloys that can store and release hydrogen were discovered, researches on hydrogen storage alloys have been continuously advanced.

LaNi.sub.5 alloy, which was initially developed (see Japanese Laid-open Patent Application No. 51-13934) is advantageous in its great storage of hydrogen. However, La is considerably expensive, coupled with another problem that the alloy is liable to be broken into fine pieces when repeating storage and release of hydrogen and is prone to be corroded on contact with alkaline or acid solutions.

In order to overcome the aforementioned problem, there has been proposed the use of Misch metal (hereinafter referred to simply as Mm) wherein part of La is replaced by Ce, Pr, Nd or other rare earth metals, or a LaNi.sub.5 hydrogen storage alloy wherein part of Ni is placed by a metal such as Co, Al, Mn or the like. These proposals are set out, for example, in Japanese Laid-open Patent Application Nos. 53-4918, 54-64014, 60-250558, 61-91862 and 61-233969.

Nevertheless, a hydrogen storage alloy with high hydrogen capacity is still required. Accordingly, one purpose of this invention is providing a hydrogen storage alloy with a maximum hydrogen concentration, (H/Lm($Ni_xAl_yMo_z$)), equal to 7. "H/Lm ($Ni_xAl_yMo_z$)" represents hydrogen storage capacities. For example, a H/Lm ($Ni_xAl_yMo_z$) equal to 7 means each lattice unit of a hydrogen storage alloy can store 7 hydrogen atoms.

Besides, the other purpose of this invention is providing a hydrogen storage alloy; more specifically, the hydrogen storage alloy has a slight hysteresis such that the hydrogen storage device for filling the hydrogen storage alloy can stably execute hydrogen absorption/desorption reactions.

SUMMARY OF THE INVENTION

One main purpose of this invention is to provide a hydrogen storage alloy and, more specifically, a hydrogen storage alloy with a narrow hysteresis and a maximum hydrogen concentration, (H/Lm ($Ni_xAl_yMo_z$)), equal to 7.

The hydrogen storage alloy according to one preferred embodiment of this invention is an $AB_w$ type alloy and represented by the general formula: Lm(NixAlyMoz), wherein $4.7 \leq w \leq 5.3$, $w=x+y+z$, and x, y and z are a mole number, respectively. Lm is a La-rich misch metal and comprises La, Ce, Pr, and Nd.

In one preferred embodiment, x is within a range from 4.3 to 5.0, y is within a range from 0 to 0.5, and z is within a range from 0 to 0.5.

In one preferred embodiment, when La occupies in an amount of 70 to 90 wt. % of Lm, Ce occupies in an amount of 5 to 25 wt. % of Lm, and (Nd+Pr) occupies in an amount less than or equal to 15 wt. % of Lm, a plateau desorption pressure of the hydrogen storage alloy is less than or equal to 5 atm. at room temperatures.

In another preferred embodiment, when La occupies in an amount of 50 to 70 wt. % of Lm, Ce occupies in an amount of 25 to 45 wt. % of Lm, and (Nd+Pr) occupies in an amount less than or equal to 10 wt. % of Lm, a plateau desorption pressure of the hydrogen storage alloy is less than or equal to 10 atm. at room temperatures.

The advantage and spirit of the invention may be understood by the following recitations together with the appended drawings.

BRIEF DESCRIPTION OF THE APPENDED DRAWINGS

DETAILED DESCRIPTION OF THE INVENTION

This invention provides a hydrogen storage alloy and, more specifically, a hydrogen storage alloy with a narrow hysteresis and a maximum hydrogen concentration, (H/Lm ($Ni_xAl_yMo_z$)), equal to 7.

The hydrogen storage alloy according to one preferred embodiment of this invention is an $AB_w$ type alloy and represented by the general formula:

Lm(NixAlyMoz), wherein $4.7 \leq w \leq 5.3$, $w=x+y+z$, and x, y and z are a mole number, respectively. Lm is a La-rich misch metal and comprises La, Ce, Pr, and Nd.

In one preferred embodiment, x is within a range from 4.3 to 5.0, y is within a range from 0 to 0.5, and z is within a range from 0 to 0.5.

In one preferred embodiment, when La occupies in an amount of 70 to 90 wt. % of Lm, Ce occupies in an amount of 5 to 25 wt. % of Lm, and (Nd+Pr) occupies in an amount less than or equal to 15 wt. % of Lm, a plateau desorption pressure of the hydrogen storage alloy is less than or equal to 5 atm. at room temperatures.

In another preferred embodiment, when La occupies in an amount of 50 to 70 wt. % of Lm, Ce occupies in an amount of 25 to 45 wt. % of Lm, and (Nd+Pr) occupies in an amount less than or equal to 10 wt. % of Lm, a plateau desorption pressure of the hydrogen occlusive alloy is less than or equal to 10 atm. at room temperatures.

Several embodiments are described below for clearly showing the characteristics, spirits, and conveniences of this invention.

The First Embodiment

The hydrogen storage alloy of the first embodiment is an $AB_{4.95}$ type alloy and represented by the general formula:

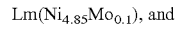

$Lm(Ni_{4.85}Mo_{0.1})$, and wherein La occupies in an amount of 70 to 90 wt. % of Lm, Ce occupies in an amount of 5 to 25 wt. % of Lm, and (Nd+Pr) occupies in an amount less than or equal to 15 wt. % of Lm.

Figure 1:
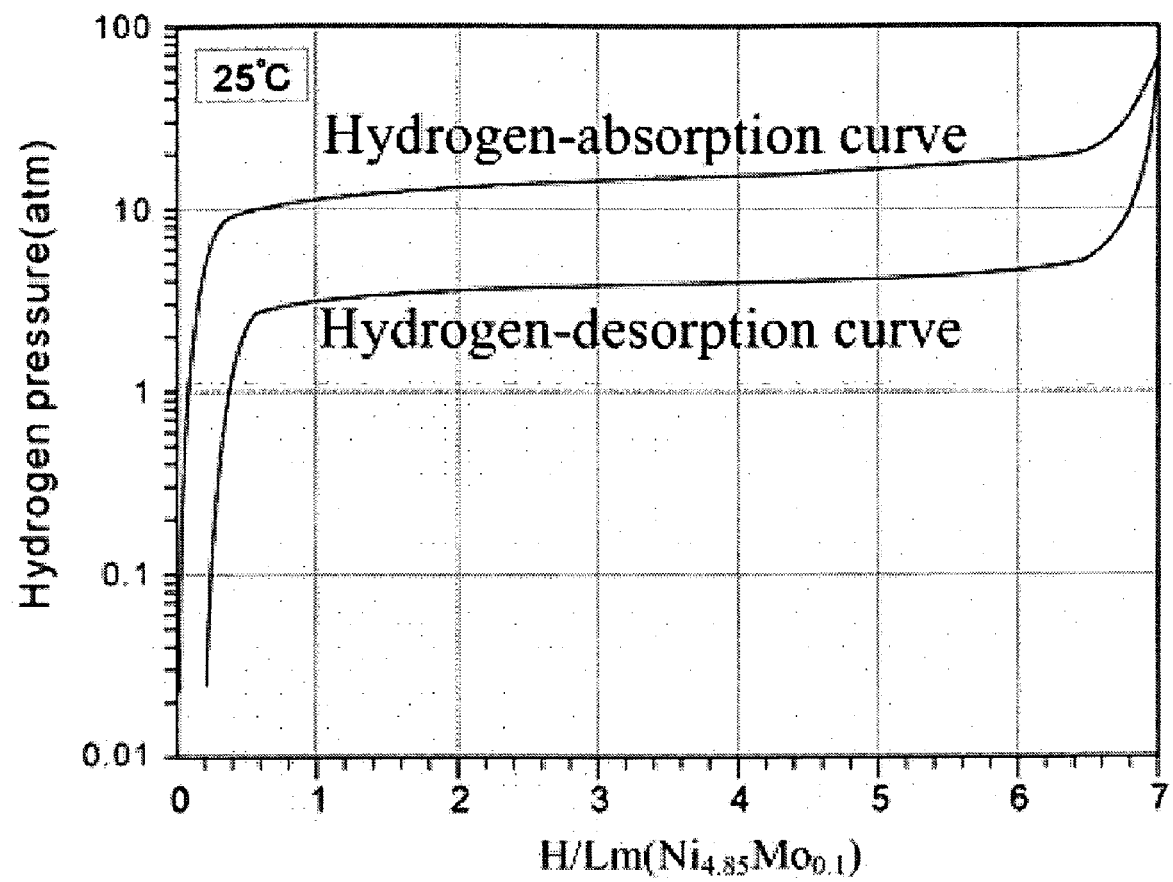
FIG. 1 shows the PCT curve under hydrogen absorption/desorption tests for the hydrogen storage alloy in the first embodiment.

Please refer to FIG. 1. FIG. 1 shows the PCT (pressure-composition-isotherm) curve under hydrogen absorption/desorption tests for the hydrogen storage alloy in the first embodiment. The testing circumstance is under the constant temperature of 25° C.

As shown in FIG. 1, obviously, the hydrogen-absorption curve and the hydrogen-desorption curve both have a plateau region. The plateau desorption pressure of the hydrogen storage alloy in the first embodiment is roughly equal to 3.5 atm. One thing should be noted is that, compared with prior arts, the hydrogen storage alloy in the first embodiment has a maximum hydrogen concentration, (H/Lm (Ni$_x$Al$_y$Mo$_z$)), equal to 7. Besides, the plateau absorption pressure of the hydrogen storage alloy in the first embodiment is approximately equal to 15 atm.; this plateau desorption pressure shows the hydrogen storage alloy in the first embodiment has a slight hysteresis. The hysteresis shown in FIG. 1 is normal.

The Second Embodiment

The hydrogen storage alloy of the second embodiment is an AB$_{5.05}$ type alloy and represented by the general formula:

Lm(Ni$_{4.85}$Al$_{0.1}$Mo$_{0.1}$), and wherein La occupies in an amount of 70 to 90 wt. % of Lm, Ce occupies in an amount of 5 to 25 wt. % of Lm, and (Nd+Pr) occupies in an amount less than or equal to 15 wt. % of Lm.

Figure 2:
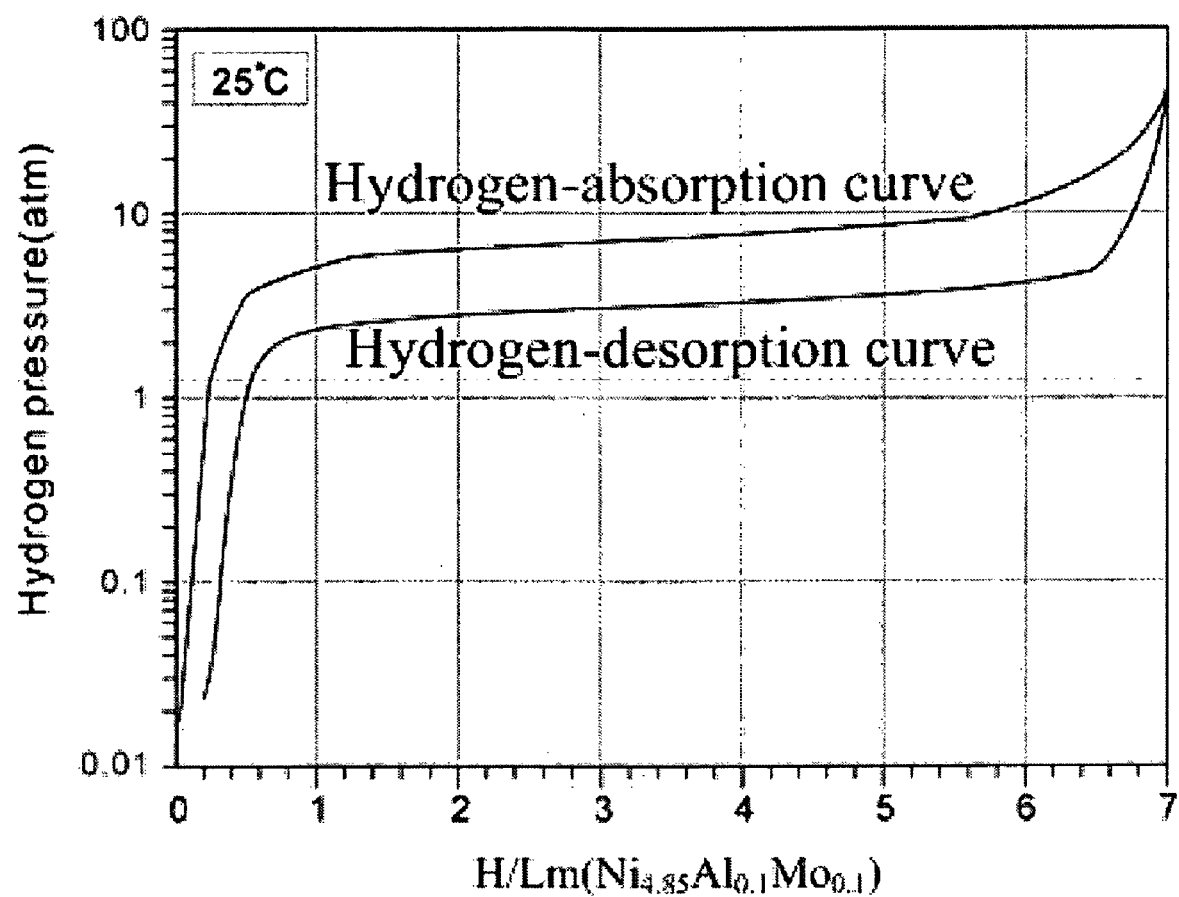
FIG. 2 shows the PCT curve under hydrogen absorption/desorption tests for the hydrogen storage alloy in the second embodiment.

Please refer to FIG. 2. FIG. 2 shows the PCT curve under hydrogen absorption/desorption tests for the hydrogen storage alloy in the second embodiment. The testing circumstance is under the constant temperature of 25° C.

As shown in FIG. 2, obviously, the hydrogen-absorption curve and the hydrogen-desorption curve both have a plateau region. The plateau desorption pressure of the hydrogen storage alloy in the second embodiment is roughly equal to 2.5 atm. One thing should be noted is that, compared with prior arts, the hydrogen storage alloy in the second embodiment has a maximum hydrogen concentration, (H/Lm (Ni$_x$Al$_y$Mo$_z$)), equal to 7. Besides, the plateau absorption pressure of the hydrogen storage alloy in the second embodiment is approximately equal to 7 atm.; this plateau desorption pressure shows the hydrogen storage alloy in the second embodiment has a slighter hysteresis than that in the first embodiment. The hysteresis shown in FIG. 2 is obviously improved compared with FIG. 1.

The Third Embodiment

The hydrogen storage alloy of the third embodiment is an AB$_{4.95}$ type alloy and represented by the general formula:

Lm(Ni$_{4.85}$Mo$_{0.1}$), and wherein La occupies in an amount of 50 to 70 wt. % of Lm, Ce occupies in an amount of 25 to 45 wt. % of Lm, and (Nd+Pr) occupies in an amount less than or equal to 10 wt. % of Lm.

Figure 3:
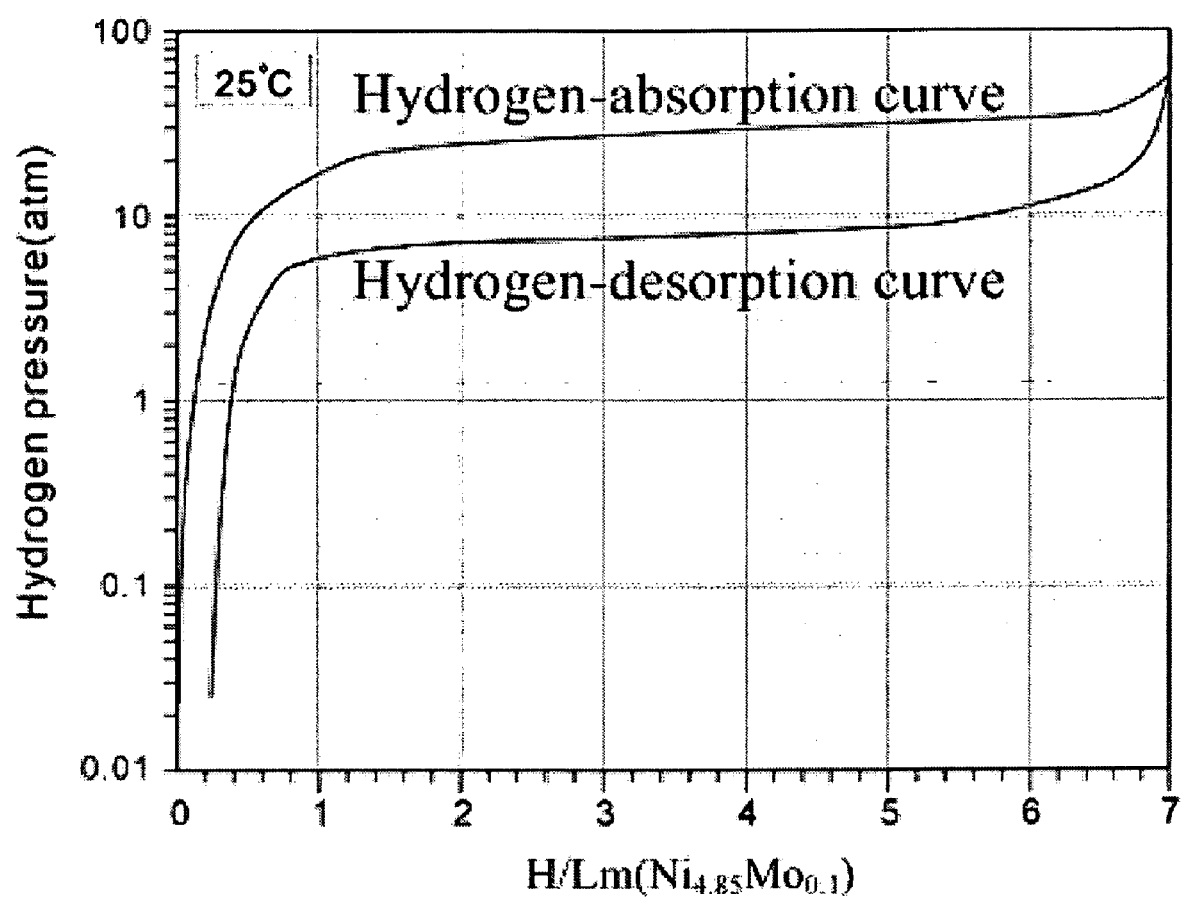
FIG. 3 shows the PCT curve under hydrogen absorption/desorption tests for the hydrogen storage alloy in the third embodiment.

Please refer to FIG. 3. FIG. 3 shows the PCT curve under hydrogen absorption/desorption tests for the hydrogen storage alloy in the third embodiment. The testing circumstance is under the constant temperature of 25° C.

As shown in FIG. 3, obviously, the hydrogen-absorption curve and the hydrogen-desorption curve both have a plateau region. The plateau desorption pressure of the hydrogen storage alloy in the third embodiment is roughly equal to 7.5 atm. One thing should be noted is that, compared with prior arts, the hydrogen storage alloy in the third embodiment has a maximum hydrogen concentration, (H/Lm (Ni$_x$Al$_y$Mo$_z$)), equal to 7. Besides, the plateau absorption pressure of the hydrogen storage alloy in the third embodiment is approximately equal to 30 atm.; this plateau desorption pressure shows the hydrogen storage alloy in the third embodiment has a slight hysteresis. The hysteresis shown in FIG. 3 is normal.

The Fourth Embodiment

The hydrogen storage alloy of the fourth embodiment is an AB$_{5.05}$ type alloy and represented by the general formula:

Lm(Ni$_{4.85}$Al$_{0.1}$Mo$_{0.1}$), and wherein La occupies in an amount of 50 to 70 wt. % of Lm, Ce occupies in an amount of 25 to 45 wt. % of Lm, and (Nd+Pr) occupies in an amount less than or equal to 10 wt. % of Lm.

Figure 4:
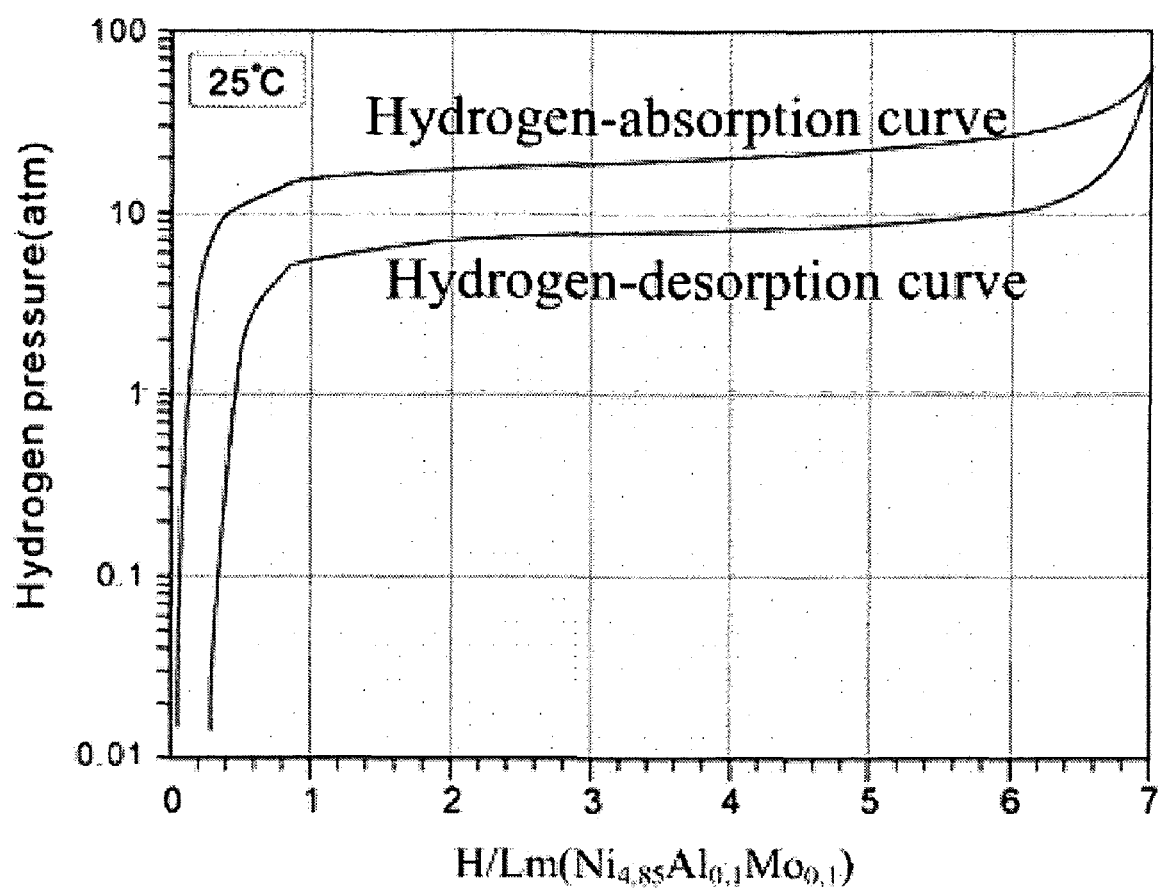
FIG. 4 shows the PCT curve under hydrogen absorption/desorption tests for the hydrogen storage alloy in the fourth embodiment.

Please refer to FIG. 4. FIG. 4 shows the PCT curve under hydrogen absorption/desorption tests for the hydrogen storage alloy in the fourth embodiment. The testing circumstance is under the constant temperature of 25° C.

As shown in FIG. 4, obviously, the hydrogen-absorption curve and the hydrogen-desorption curve both have a plateau region. The plateau desorption pressure of the hydrogen storage alloy in the fourth embodiment is roughly equal to 7 atm. One thing should be noted is that, compared with prior arts, the hydrogen storage alloy in the fourth embodiment has a maximum hydrogen concentration, (H/Lm (Ni$_x$Al$_y$Mo$_z$)), equal to 7. Besides, the plateau absorption pressure of the hydrogen storage alloy in the second embodiment is approximately equal to 20 atm.; this plateau desorption pressure shows the hydrogen storage alloy in the second embodiment has a slighter hysteresis than that in the third embodiment. The hysteresis shown in FIG. 4 is obviously improved compared with FIG. 3.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A hydrogen storage alloy with a narrow hysteresis and a maximum hydrogen concentration, (H/Lm(Ni$_x$Al$_y$Mo$_z$)), equal to 7, the hydrogen storage alloy being an AB$_w$ type alloy and represented by the general formula:

Lm(Ni$_x$Al$_y$Mo$_z$), and wherein $4.7 \leq w \leq 5.3$, Lm is a La-rich misch metal containing La, Ce, Pr, and Nd., w=x+y+z, x, y and z are a mole number, respectively; $4.3 \leq x \leq 5.0$, $0 < y \leq 0.5$ and $0 < z \leq 0.5$.

2. The hydrogen storage alloy of claim 1, wherein when La occupies in an amount of 70 to 90 wt. % of Lm, Ce occupies in an amount of 5 to 25 wt. % of Lm, and (Nd+Pr) occupies in an amount less than or equal to 15 wt. % of Lm, a plateau desorption pressure of the hydrogen storage alloy is less than or equal to 5 atm. at room temperatures.

3. The hydrogen storage alloy of claim 1, wherein when La occupies in an amount of 50 to 70 wt. % of Lm, Ce occupies in an amount of 25 to 45 wt. % of Lm, and (Nd+Pr) occupies in an amount less than or equal to 10 wt. % of Lm, a plateau desorption pressure of the hydrogen storage alloy is less than or equal to 10 atm. at room temperatures.

* * * * *